United States Patent [19]
Parisotto et al.

[11] 3,841,717
[45] Oct. 15, 1974

[54] TRACK SLIDE ASSEMBLY

[75] Inventors: Antonio Parisotto, Coniston, Ontario; James Nemis, Sudbury, Ontario, both of Canada

[73] Assignee: Original Equipment Manufacturing Limited, Sudbury, Ontario, Canada

[22] Filed: May 29, 1973

[21] Appl. No.: 364,507

[52] U.S. Cl. .................... 305/25, 180/5 R, 308/238
[51] Int. Cl. ............................................. B62d 55/10
[58] Field of Search ................ 180/5 R; 305/24, 25

[56] References Cited
UNITED STATES PATENTS

| | | | |
|---|---|---|---|
| 1,929,836 | 10/1933 | Brown | 308/238 |
| 2,265,900 | 12/1941 | Gilbert | 308/238 X |
| 3,717,390 | 2/1973 | Parisotto | 180/5 R |
| 3,719,242 | 3/1973 | Duclo | 305/25 |

*Primary Examiner*—Philip Goodman

[57] ABSTRACT

A snow-mobile track assembly including wheels, a continuous flexible track, and a track slide to guide the track, the slide comprising a metal member having a low friction strip secured to the outer surface.

4 Claims, 4 Drawing Figures

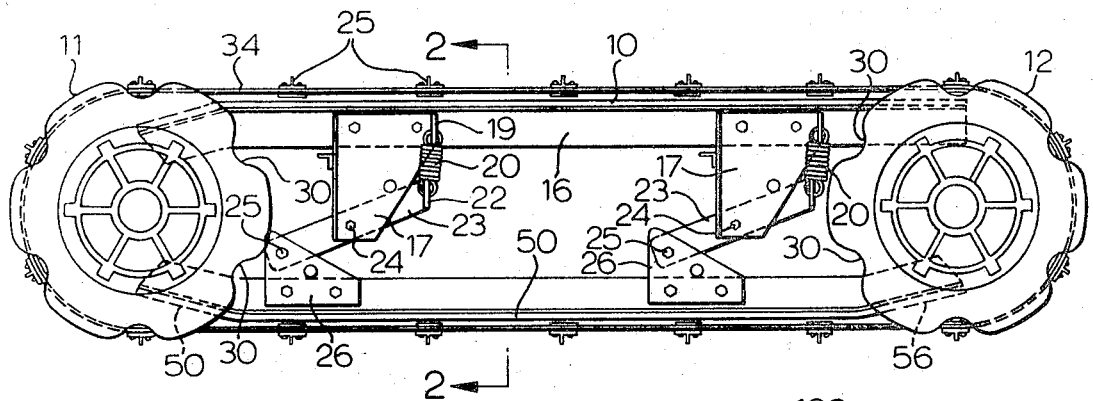
FIG.1
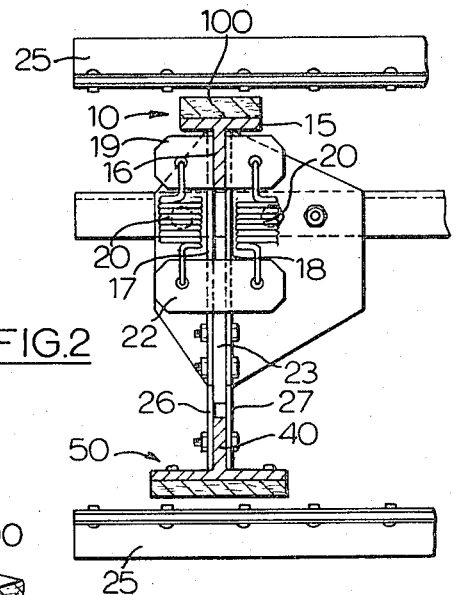
FIG.2
FIG. 3
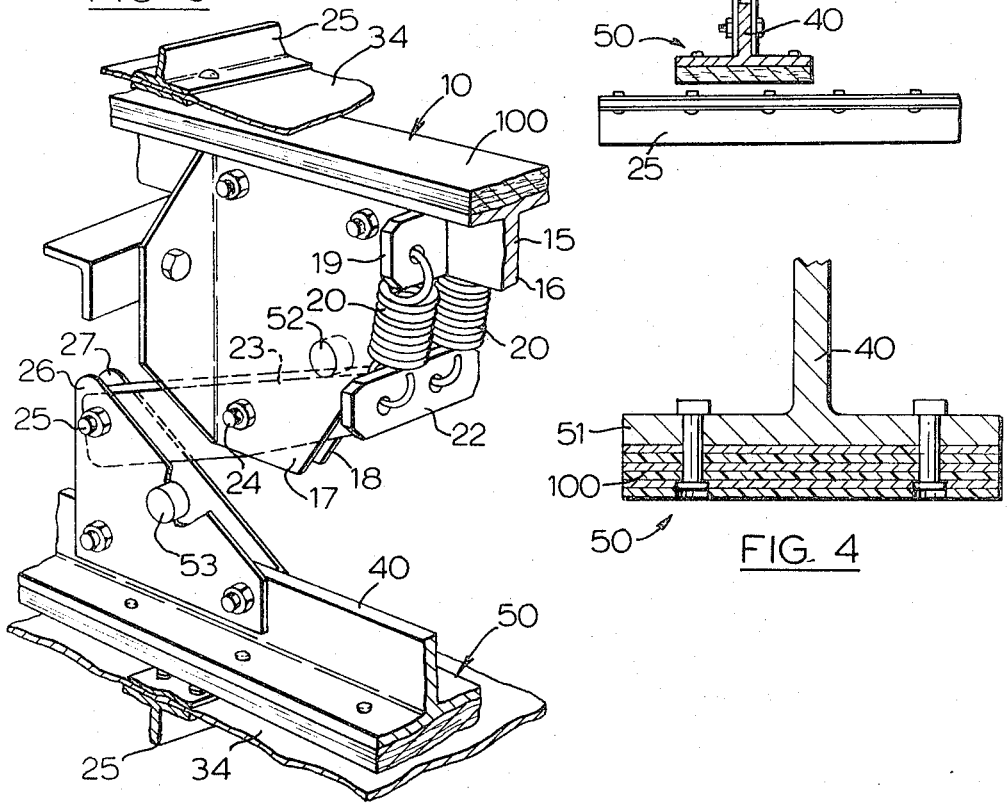
FIG. 4

3,841,717

TRACK SLIDE ASSEMBLY

This invention relates to snow-mobiles and more particularly to the track assemblies of such vehicles.

Previously, snow-mobiles have been provided either with track assemblies in which a continuous driving track extends across the vehicle or at least two spaced apart tracks have been provided one on either side of the vehicle.

In both types of track various arrangements have been provided to impart motion to the track. These usually employ at least one pair of horizontally spaced apart wheels, a forward wheel and a rear wheel, at least one of which is driven. In some cases, the guidance of the track intermediate the forward and rear wheels has been by means of a series of wheels, in other cases upper and lower fixed slides or guides are provided to ensure that the path of the track about the wheels is maintained.

These arrangements have not be satisfactory. With rigid slides or guides the smaller variations in the terrain over which the vehicle may be passing are transmitted through the frame to the rider and the steering mechanism. Apart from discomfort the vehicle is difficult to steer particularly on ice or rutted surfaces. Problems of maintenance also arise. The vibrations transmitted tend to loosen connections and lead to metal fatigue.

In our prior application, Serial No. 102,155 there was disclosed an improved track assembly for snow-mobiles employing upper and lower track slides to guide the track.

That structure, whilst giving an improved ride and traction, employed a structure in which there was metal/rubber contact and relatively high wear of the track.

It is accordingly an object of the present invention to provide an improved track assembly for snow-mobiles.

It is another object of the present invention to provide a track assembly for snow-mobiles with improved wearing characteristics.

In accordance with these objects there is provided in the present invention a snow-mobile track assembly including a pair of horizontally spaced apart wheels;

a continuous flexible driving track movable about said wheels;

the improvement which comprises at least one track slide extending between said wheels to guide said track thereabout;

said track slide having a track-engaging surface of low friction material.

The above objects and features of the invention will be more apparent from the following description and the accompanying drawings in which a preferred embodiment is described by way of example and in which:

FIG. 1 is a side view of a track assembly in accordance with the invention;

FIG. 2 is a section taken along line 2—2 of FIG. 1;

FIG. 3 is an enlarged perspective view of a track guide mounting mechanism with the track being shown in fragmentary section; and FIG. 4 is an enlarged section of the track slide illustrated in FIG. 3.

Before referring to the drawings and description, it is to be noted that the words supported and suspended are, for the purposes of this specification, to be considered as having the same meaning.

Referring now to the drawings, in FIG. 1, there is shown a side view of one side of a track assembly in accordance with the present invention. It will be understood that the remote side of the vehicle employing such a track assembly will have a similar view. The driving mechanism contemplated for the track is that which is employed in Canadian Pat. No. 610,677 issued Dec. 20, 1960 to Howard R. Schraeder although it will be understood that any suitable driving mechanism may be employed. As shown in that previous patent, the driving mechanism employs cleat sprocket wheels which are mounted on a driving shaft which is, in turn, suitably mounted on the frame or chassis of the vehicle.

As shown in FIG. 1, the assembly comprises an upper rigid track slide 10 which extends between the axes of idler wheels 11 and 12. These idler wheels 11 and 12 have spaced apart grooves 30 which receive T-cleats such as 25 which are provided on the belt 34, or in the case of a double or split track belts 34, and together with which they form the driving track. The construction of the driving track is similar to that in the previously mentioned Canadian Pat. No. 610,677. The upper rigid track slide 10 may be secured to the vehicle frame by brackets or any other suitable means.

In this embodiment a lower track slide 50 is supported or suspended from the upper track slide 10. It will, of course, be understood that the supporting or suspension may be made from any other convenient plane.

The upper track slide 10 comprises a flat elongate plate 15. To the upper surface of plate 15 a strip of low friction material 100 is secured by means of countersunk bolts or rivets.

Strip 100, whilst having low friction characteristics has to be hard and preferably a Rockwell Hardness on the M scale in the range 90 – 110. It is also essential that it should have heat stability under a continuous run at temperatures between 200° and 275°F. Such characteristics are to be found in structures composed of canvas and phenolic resins. Various materials were employed having such characteristics, however, it was found that amongst these most suitable were those laminates having the main axis of the laminae running in the same direction as the main axis of the track slide.

To the underside of plate 15 there is secured an "L-shaped" bar 16 from the depending vertical portion of which adjacent one end, which may be designated the rear end, a pair of plates 17 and 18 are secured on either side in the manner shown in FIGS. 2 and 3. From adjacent the top end of plate 17 a horizontally extending lug 19 extends and to this lug a spring 20 is secured to a second lug 22 on an arm 23. Arm 23 is pivotally mounted intermediate its length on a shaft 24 which extends through and is secured to plates 17 and 18. The lower end of arm 23 is also pivotally secured through a shaft 25 to plates 26 and 27, which are, in turn, mounted one on either side of a "T-shaped" member 40 forming part of a lower track slide, generally indicated at 50. The lower track slide 50 may, as shown in this embodiment, be provided with a further lower flatsurfaced bar 51 which is welded or otherwise suitably secured to the T-shaped bar 40.

To the underside of the lower track slide bar 51 a strip of low friction material 100 identical to that secured to the upper slide 15 is secured and in the same manner.

Between plates 26 and 27 and plates 17 and 18 there are provided rods 52 and 53 which constitute upper and lower limit abutment surfaces, respectively. Lower track slide 50 is similarly supported adjacent its forward end to the upper track slide 10. For convenience, the forward and rear lower track suspension systems are similarly numbered.

It will be noticed that arms 23 extend inwardly toward each other and that the springs 20 are mounted and biased so that they will urge the lower end of arms 23 down and the lower track slide 50 into a position in contact with a lower ground-engaging portion of the track.

It is also to be noted that the lower track slide 50 has an intermediate substantially horizontal portion and is turned up adjacent either end as at 55 and 56. The horizontal extent or the total length of the lower track slide 50 is such that it is at least equal to the distance between the axes of the idler wheels 11 and 12.

As the vehicle passes across the ground the springs 20 urge arms 23 and in turn, lower track slide 50 downward into a position contacting a lower ground-engaging portion of the track 34. When the forward portion of the track 34 encounters a small bump or rise in the ground, the forward part of track 34, and in turn, the adjacent part of the lower track slider 50 will be urged upwardly. In response to this movement, arm 23 is caused to pivot about shaft 24 and spring 20 will be extended. This motion will absorb the shock which would normally be transmitted to the vehicle in the instances where a rigid lower track slide is employed. As that portion of the track progresses over the bump, the normal tension in spring 20 will cause arm 23 to be urged downwardly and the corresponding portion of the lower track slide 50 and part of the track 34 with which it is in contact towards the ground. As the vehicle further progresses over the bump or rise, there will be a corresponding action at the rear of the track and the rear suspension of arm 23 will be caused to move up and down in a similar manner. This motion will accommodate the shocks and minimize transmission of the shocks to the remainder of the vehicle and thereby facilitate the steering and minimize the vibration to which the machine would be subject without such a suspension system on the lower track slide. The abutments 52 and 53 will limit the travel of the arms 23.

The provision of the upturned ends on the lower track slide, the tendency of track 34 to be nipped is reduced such as happens with a flat horizontal lower track slide member and there will be a continuous smooth flowing movement of the track about the corresponding idler and sprocket wheels with less wear.

The low friction strips 100, during the passage of the tracks over the track slides, minimizes the friction however, the provision of the longitudinally oriented laminae has the effect of minimizing wear and providing track slides with a longer life. When and if the laminae are damaged they tend to "peel" with the track direction. With laminae otherwise oriented damage to the track ensues due to the resistance to movement in the direction of travel of the track.

From the foregoing description, it will be seen that an improved track assembly has been provided and whilst it has been shown and described with respect to a specific embodiment, it will be understood that other equivalents may be provided which fall within the scope of the invention defined in the appended claims.

What we claim is:

1. In a snow-mobile track assembly including a pair of horizontally spaced apart wheels;
    a continuous flexible driving track movable about said wheel;
    the improvement which comprises at least one track slide extending between said wheels to guide said track thereabout;
    said track slide comprising a rigid metal member having an outer surface and a strip of low-friction material secured thereto, said strip comprising a laminate having a plurality of lamina extending in the direction of travel of said track.

2. A snow-mobile track assembly as claimed in claim 1 wherein said strip of low-friction material has a hardness on the M scale in the range 90 – 110 and is heat stable under normal running conditions.

3. A snow-mobile track assembly as claimed in claim 1 including an upper and a lower track slide, said track slides each comprising a rigid member having an outward facing surface and a strip of low-friction material secured thereto, said strip comprising a laminate having a plurality of lamina extending in the direction of travel of said driving track.

4. A snow-mobile track assembly as claimed in claim 3 wherein said strip of low-friction material has a hardness on the M scale in the range 90 – 110 and is heat stable under normal running conditions.

* * * * *